US012684195B2

(12) United States Patent
Panesar et al.

(10) Patent No.: US 12,684,195 B2
(45) Date of Patent: Jul. 14, 2026

(54) ACCOUNTING FOR LATENCY IN CONTENT STREAMS

(71) Applicants: Sony Interactive Entertainment Europe Limited, London (GB); Sony Interactive Entertainment LLC, San Mateo, CA (US)

(72) Inventors: Pritpal Singh Panesar, London (GB); Lloyd Preston Stemple, London (GB); Erick Flores, San Mateo, CA (US); Maria Chiara Monti, London (GB)

(73) Assignees: Sony Interactive Entertainment LLC, San Mateo, CA (US); Sony Interactive Entertainment Europe Limited, London (GB)

( * ) Notice: Subject to any disclaimer, the term of this patent is extended or adjusted under 35 U.S.C. 154(b) by 0 days.

(21) Appl. No.: 18/959,493

(22) Filed: Nov. 25, 2024

(65) Prior Publication Data

US 2025/0175673 A1    May 29, 2025

(30) Foreign Application Priority Data

Nov. 26, 2023    (GB) ...................................... 2318034

(51) Int. Cl.
H04N 21/442 (2011.01)
H04N 21/4402 (2011.01)
(52) U.S. Cl.
CPC ................ H04N 21/44209 (2013.01); H04N 21/440281 (2013.01)

(58) Field of Classification Search
None
See application file for complete search history.

(56) References Cited

U.S. PATENT DOCUMENTS

| | | | |
|---|---|---|---|
| 2019/0118084 A1* | 4/2019 | Ng | A63F 13/352 |
| 2020/0195541 A1* | 6/2020 | Tamasi | H04L 65/80 |
| 2020/0320592 A1* | 10/2020 | Soule | H04W 4/10 |
| 2021/0146240 A1* | 5/2021 | Colenbrander | H04N 21/2402 |
| 2021/0195262 A1* | 6/2021 | McAuley | H04N 21/44209 |
| 2022/0233953 A1* | 7/2022 | Labate | A63F 13/358 |
| 2022/0408097 A1* | 12/2022 | Lin | H04N 19/136 |
| 2023/0033340 A1* | 2/2023 | Cary | A63F 13/44 |
| 2023/0267063 A1* | 8/2023 | Li | G06F 11/3419 |
| | | | 703/22 |
| 2024/0223788 A1* | 7/2024 | Thomas | H04N 19/423 |

OTHER PUBLICATIONS

Combined Search and Examination Report received in Application No. GB2318034.2, dated Jun. 12, 2024, in 7 pages.

* cited by examiner

*Primary Examiner* — Alexander Q Huerta
(74) *Attorney, Agent, or Firm* — Fish & Richardson P.C.

(57) ABSTRACT

There has been provided a method of modifying a content stream provided to a user electronic device, the method comprising receiving device data from the user electronic device, processing the device data to determine whether one or more network conditions have been met, and modifying the content stream and/or one or more settings associated with either the content stream and or a game server. There has also provided a method of rendering a content stream provided by a sender, the method comprising, sending device data, receiving a modified content stream, and rendering the modified content stream.

20 Claims, 12 Drawing Sheets

ACCOUNTING FOR LATENCY IN CONTENT STREAMS

CROSS-REFERENCE TO RELATED APPLICATIONS

This application claims priority to United Kingdom Patent Application No. GB2318034.2, filed Nov. 26, 2023, the contents of which are incorporated herein by reference.

BACKGROUND

The present specification relates to the sending, receipt, and outputting of content streams.

The streaming of content, for example on a TV, games console, computer, of mobile phone, for both educational, work and entertainment purposes is now a part of everyday life for most people. For example, a content stream may be a live sport or music event broadcast, a video game, a conference, or a video from a popular online streamer.

A content stream (or broadcast presentation) comprises content from a plurality of sources. Each source can provide one or more of audio, video, data, metadata or other content. Thus, a significant amount of information can be contained in a single content stream output to a viewer.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a method of modifying a content stream provided to a user electronic device, the method comprising receiving device data from the user electronic device, processing the device data to determine whether one or more network conditions have been met, and modifying the content stream and/or one or more settings associated with either the content stream and or a game server.

Optionally, the modifying further comprises modifying a user input window r when it is determined that the one or more network conditions have been met.

Optionally, the modifying further comprises adjusting a refresh rate of the content stream when it is determined that the one or more network conditions have been met, wherein the refresh rate is indicative of a number of image frames of the content stream that are displayed per second.

Optionally, the modifying further comprises replacing elements within the content stream with a lower level of detail (LOD) version of the elements when it is determined that the one or more network conditions have been met.

Optionally, the modifying further comprises dividing the content stream into a first and second portion, and wherein providing (350) the content stream comprises providing the first portion to the user electronic device 13 whilst the second portion is being buffered.

Optionally, the content stream comprises a plurality of elements, and wherein the modifying comprises determining a dynamic element of a plurality of elements and a static element of the plurality of elements, and updating only the dynamic elements of the content stream.

Optionally, the one or more network conditions comprise network latency.

Optionally, the device data comprises network condition data associated with the user electronic device.

Optionally, the network condition data is determined using an artificial neural network (ANN), wherein the ANN is trained using historical data indicative of the one or more network conditions at the user electronic device, and wherein the ANN is configured to predict the occurrence of the one or more network conditions based on real time network data.

According to a second aspect of the present disclosure, there is provided a method of rendering a content stream provided by a sender, the method comprising, sending device data, receiving a modified content stream, and rendering the modified content stream.

Optionally, the modified content stream comprises low level of detail (LOD) elements, and wherein rendering the modified content stream further comprises identifying the low LOD elements within the received modified content stream, using an artificial neural network to determine high LOD elements within an element database which correspond to the low LOD elements, and rendering the modified content stream on the user electronic device, wherein the low LOD elements are replaced with the determined high LOD elements.

According to a third aspect of the present disclosure, there is provided a sender device comprising a processor, and memory including executable instructions that, as a result of execution by the processor, cause the sender electronic device to receive device data from the user electronic device, process the device data to determine whether one or more network conditions have been met, and modify the content stream and/or one or more settings associated with either the content stream and/or a game server.

Optionally, the modifying further comprises replacing elements within the content stream with a lower level of detail (LOD) version of the elements when it is determined that the one or more network conditions have been met.

Optionally, the modifying further comprises dividing the content stream into a first and second portion, and wherein providing (350) the content stream comprises providing the first portion to the user electronic device 13 whilst the second portion is being buffered.

Optionally, the content stream comprises a plurality of elements, and wherein the modifying comprises determining a dynamic element of a plurality of elements and a static element of the plurality of elements, and updating only the dynamic elements of the content stream.

Optionally, the one or more network conditions comprise network latency.

Optionally, the device data comprises network condition data associated with the user electronic device.

Optionally, the network condition data is determined using an artificial neural network (ANN), wherein the ANN is trained using historical data indicative of the one or more network conditions at the user electronic device, and wherein the ANN is configured to predict the occurrence of the one or more network conditions based on real time network data.

According to a fourth aspect of the present disclosure, there is provided user electronic device, comprising a display screen, a processor and memory including executable instructions that, as a result of execution by the processor, cause the user electronic device to send device data, receive a modified content stream, and render the modified content stream.

Optionally, the modified content stream comprises low level of detail (LOD) elements, and wherein the user electronic device is configured to render the modified content stream, wherein rendering the modified content stream further comprises identifying the low LOD elements within the received modified content stream, using an artificial neural network to determine high LOD elements within an element database which correspond to the low LOD elements, and rendering the modified content stream on the user electronic device, wherein the low LOD elements are replaced with the determined high LOD elements.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figures 1A, 1B:
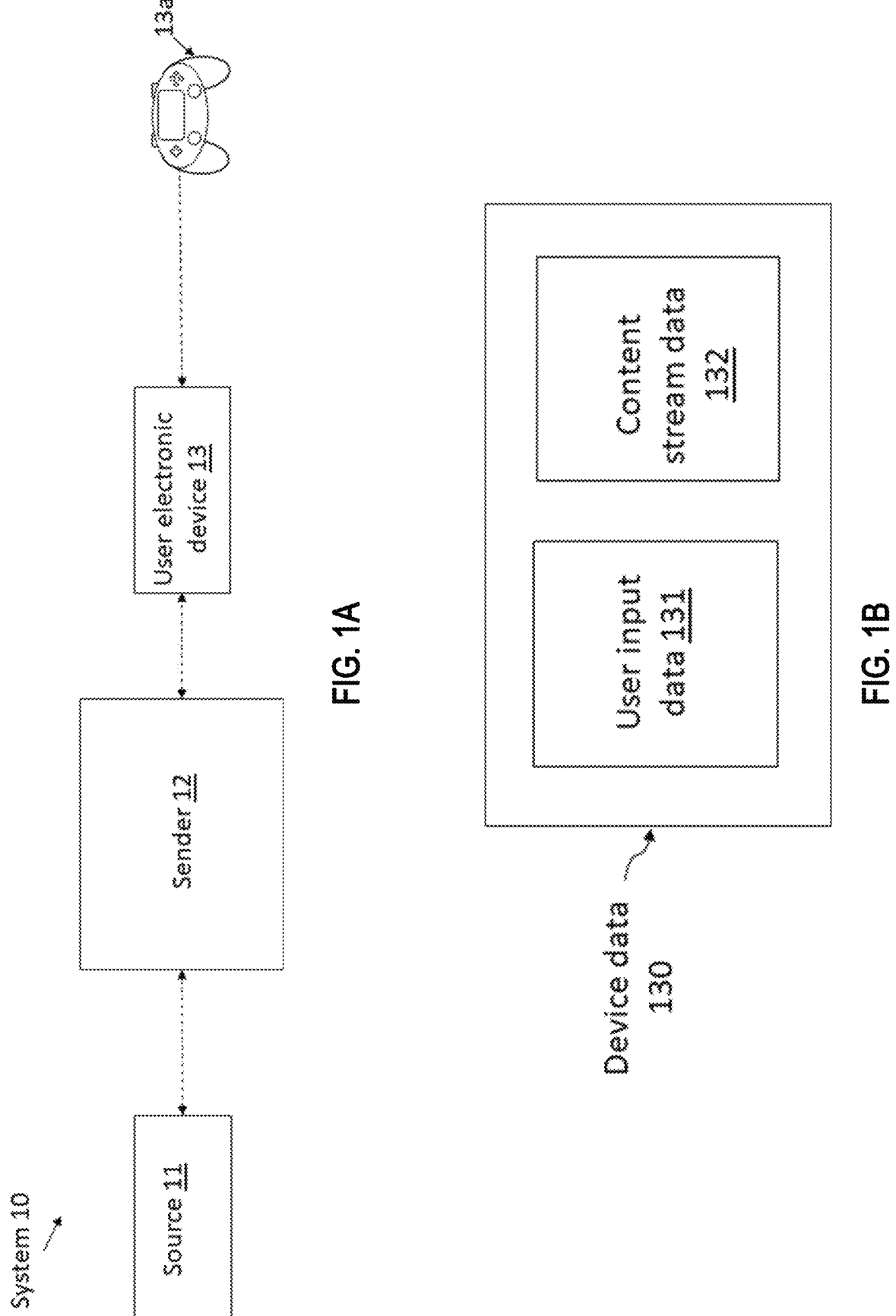
FIG. 1A is a block diagram illustrating a system according to an embodiment of this disclosure.
FIG. 1B is a block diagram representing device data according to an embodiment of this disclosure.

FIG. 1A is a simplified representation of a system 10 according to an embodiment of this disclosure. A sender 12 is configured to communicate with a user electronic device 13. It will be appreciated that although FIG. 1A shows one user electronic device 13, any number of user electronic devices may be in communication with the sender 12. The sender 12 is also an electronic device. The sender 12 may be referred to as a broadcaster. It will be appreciated that the term computing device may be used interchangeably with electronic device in the present disclosure.

The user electronic device 13 and the sender 12 may be any type of computing device, including but not limited to, a PC, laptop, tablet computer, mobile phone, television or smart TV, smart watch, and/or gaming console. It will be appreciated that the sender 12 and the user electronic device 13 may comprise a plurality of electronic devices operably in communication with each other.

The sender 12 is configured to communicate with the user electronic device via any suitable communication channel. For example, the sender 12 may communicate with the user electronic device 13 via Wi-Fi®, wired or wireless internet connection, NFC, Bluetooth®, etc.

A source 11 is also in operable communication with the sender 12 via any suitable communication channel. The source 11 is configured to provide an input content stream to the sender 12, wherein the input content stream comprises a plurality of tracks. In an embodiment, the source 11 may be the sender 12. In an embodiment, at least one of the tracks may be provided by the sender 12.

An input device 13a is also in operable communication with the user electronic device 13, via any suitable wired or wireless communication channel. The input device 13a may be any input device capable of providing user input such as a controller or keyboard. In an embodiment, the input device 13a is part of the user electronic device 13 itself. For example, the user electronic device 13 may be a touch screen device, and the input device 13a may be a touch screen input.

Figure 2:
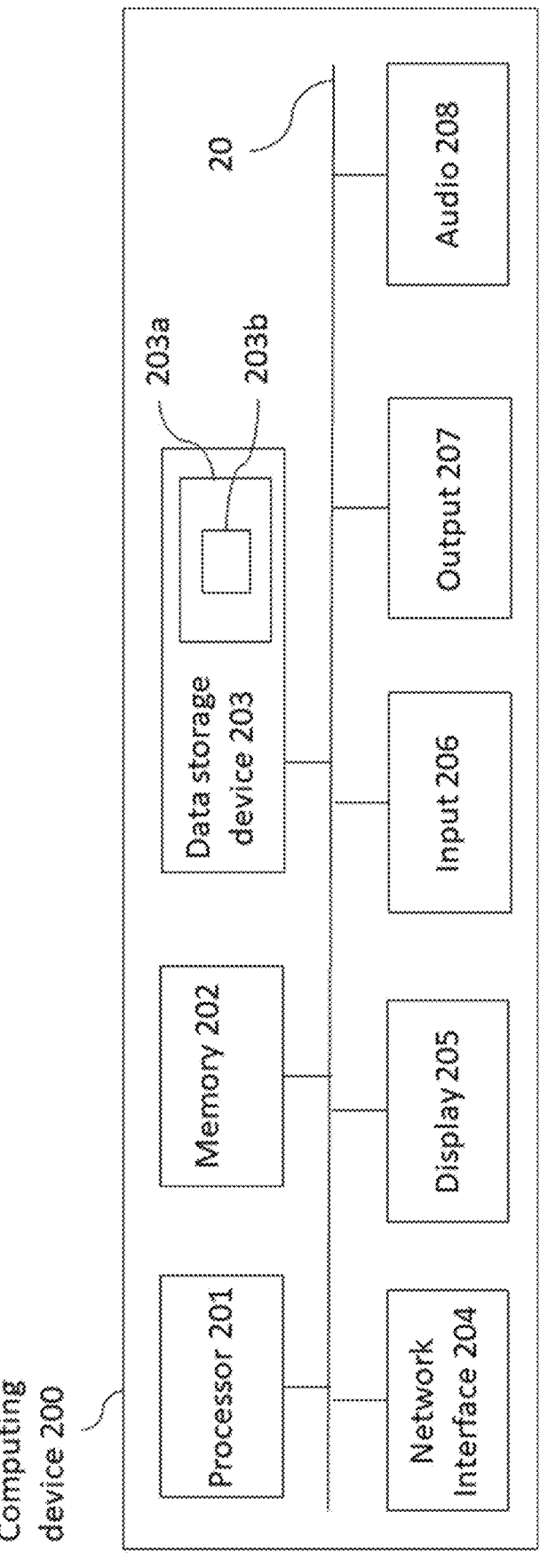
FIG. 2 is a block diagram illustrating a user electronic device or a sender device according to an embodiment of this disclosure.

FIG. 2 illustrates a block diagram of one example implementation of a computing device 200 that may form part of the sender 12 or the user electronic device 13.

The computing device 200 is associated with executable instructions for causing the computing device 200 to perform any one or more of the methodologies discussed herein. The computing device 200 may operate in the capacity of the data model or one or more computing resources for implementing the data model for carrying out the methods of the present disclosure. In alternative implementations, the computing device 200 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 200 includes a processing device 201, a memory device 202, and a secondary memory (e.g., a data storage device 203), which communicate with each other via a bus 20. The memory device may be read-only memory (ROM), flash memory, dynamic random-access memory (DRAM) such as synchronous DRAM (SDRAM) or Rambus DRAM (RDRAM), static random-access memory (SRAM), etc.

Processing device 201 represents one or more general-purpose processors such as a microprocessor, central processing unit, or the like. More particularly, the processing device 201 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 201 may also be one or more special-purpose processing devices such as an application specific integrated circuit (ASIC), a field programmable gate array (FPGA), a digital signal processor (DSP), network processor, or the like. Processing device 201 is configured to execute the processing logic (instructions 203b) for performing the operations and steps discussed herein.

The computing device 200 may further include a network interface device 204. The computing device 200 also may include a video display unit 205 (e.g., a liquid crystal display (LCD) or a cathode ray tube (CRT)), and an audio device 208 (e.g., a speaker). The computing device 200 may further include a data input 206 and a data output 207 to receive and send data to and from the computing device 200.

The data storage device 203 may include one or more machine-readable storage media (or more specifically one or more non-transitory computer-readable storage media) 203*a* on which is stored one or more sets of instructions 203*b* embodying any one or more of the methodologies or functions described herein. The instructions 203*b* may also reside, completely or at least partially, within the memory device 202 and/or within the processing device 201 during execution thereof by the computer system 200, the memory device 202 and the processing device 201 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1B is a simplified representation of device data 130 generated by the user electronic device 13. The device data 130 comprises user input data 131. The user input data 131 comprises information regarding any inputs provided by the user of the user electronic device via the input device 13*a*. For example, the user input data 131 may comprise information to indicate that the user has pressed a button on a controller.

The device data 100 further comprises content stream data 132. The content stream data 132 comprises information regarding the condition of the content stream that is sent to the user electronic device. For example, the content stream data 132 may comprise information to indicate time of receipt of the content stream at the user electronic device 13.

Figure 3:
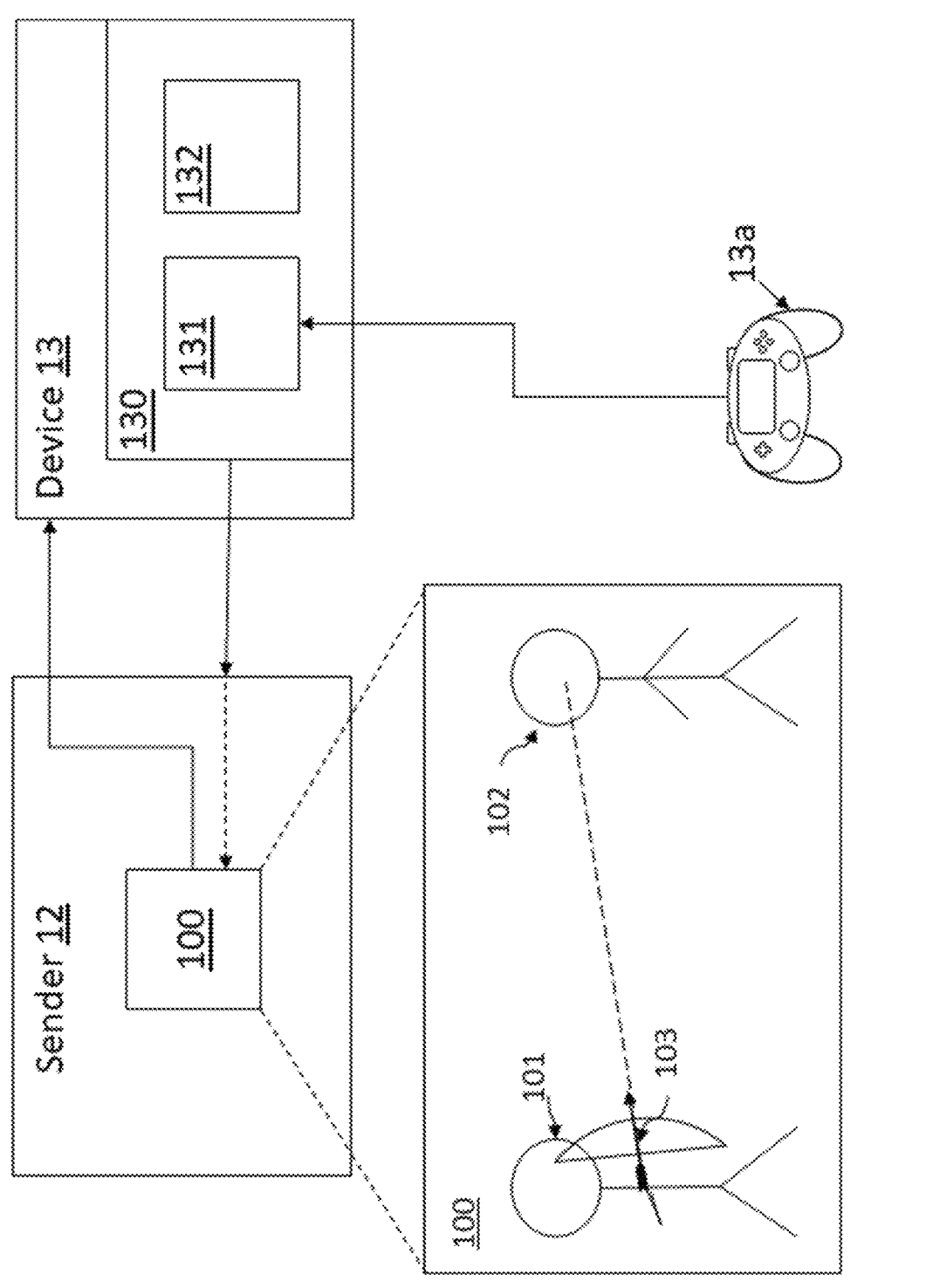
FIG. 3 illustrates the provisioning of a content stream from a sender to a user electronic device according to an embodiment of this disclosure.

FIG. 3 illustrates the provisioning of a content stream from a sender to a user electronic device. The content stream 100 as shown in FIG. 3 is a single frame of a video game. The frame comprises a static and dynamic elements. A playable character 101 and a non-playable character (NPC) 102 are static elements whilst an arrow 103 is a dynamic element. Though the single frame of the content stream 100 depicts all the elements as being static, the dynamic elements in the fully rendered content stream 100 appear to move.

The state of the elements within the content stream are not limited to a fixed static and dynamic state however. As the content stream is rendered and the user plays the video game, the elements may switch between a static and dynamic state. For example, although the arrow 103 is dynamic in the frame as shown in FIG. 3 (and possibly also in the next few frames), as the content stream progresses, the arrow 103 may come to a halt, at which point it becomes a static element in the content stream 100.

The content stream 100 is not limited to a video game. Any type of content stream, such a video may be provided by the sender 12 to the user electronic device 13. In alternative embodiments, a plurality of content streams may be sent to the user electronic device 13 at the same time.

As shown in FIG. 3, an input device 13*a* (such as a controller or the like) is used to provide a user input with respect to the content stream 100. The user input is stored as user input data 131 within the device data 130 of the user electronic device 13. The user input data 131 comprises information to update a game state of the content stream 100 such that the playable character 101 is to release the arrow 103 towards the NPC 102. The user input data 131 is not limited to any one specific action. Depending on the type of content stream that is provided, the user input data 131 may comprise information that may define any of a plurality of actions, such as pausing a video stream, or skipping an audio track.

The device data 130 further comprises content stream data 132. The content stream data 132 comprises information regarding the time of receipt of the content stream 100. The content stream data 132 may comprise any type of information that is relevant to the content stream 100 such as information about the condition of the content stream 100 at the time of receipt.

The device data 130 is used by the sender 12 to determine how the content stream 100 is to be modified.

Figure 4:
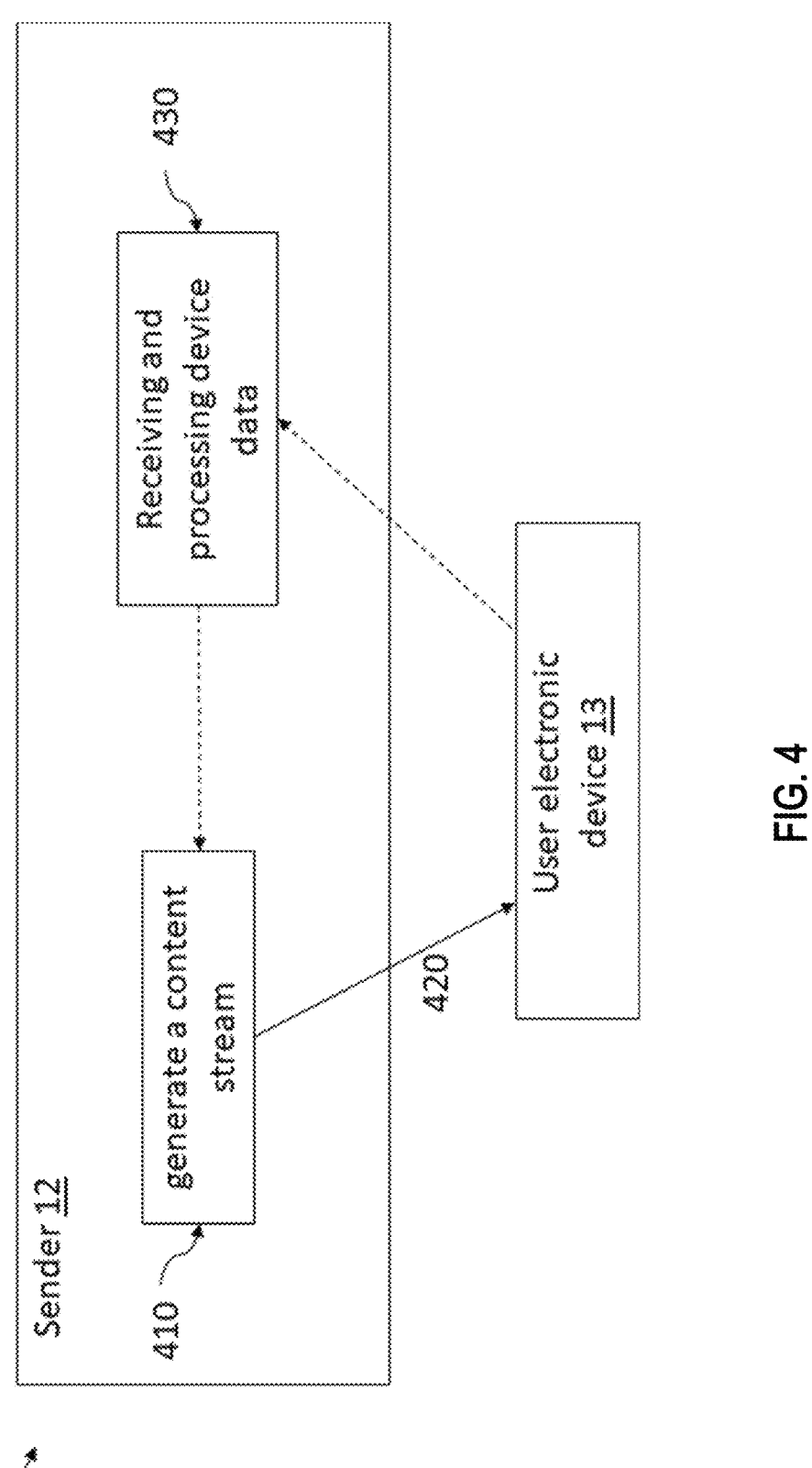
FIG. 4 is a flowchart illustrating a method of modifying a content stream according to an embodiment of this disclosure.

A method 400 of modifying a content stream according to an embodiment of this disclosure is illustrated in the flow-chart in FIG. 4. As such, the method 400 is from the perspective of the sender 12. For simplicity, the steps of method 400 are described in the context of a video content stream such as the one illustrated in FIG. 3. As such, further reference is made to FIG. 3. The present disclosure is however not limited to a video game content stream as the techniques described herein apply equally to other types of content streams.

At step 410, the content stream 100 is generated at the sender 12, and at step 420, the generated content stream 100 is provided to the user electronic device 13. Steps 410 and 420 occur as a constant process where the sender 12 keeps generating and sending the content stream 100 to the user electronic device 13. In this embodiment, the sender 12 provides the content stream 100 to the user electronic device 13 via any wired or wireless communication channel.

At step 430, the method 400 includes receiving and processing device data 130 from the user electronic device 13. In this embodiment, the device data 130 comprises user input data 131 and content stream data 132. The user input data 131 comprises instructions to update a game state of the content stream 100 such that the playable character 101 is to release the arrow 103 towards the NPC 102. The content stream data 132 comprises information regarding the time of receipt of the content stream 100.

The sender 12 obtains the user input data 131 to determine how to update the game state of the content stream 100 to reflect the action as defined by the user input data 131. In this embodiment, the content stream is modified such that the playable character 101 releases the arrow 103 towards the NPC 102.

The sender 12 obtains the content stream data to determine whether any network conditions exist. For simplicity, the embodiments described herein assume that the sender 12 has determined the presence of latency.

Processing the device data 130 comprises determining how the game state of the content stream is to be updated based on the user input data 131, and determining whether there is any latency between the sending of the content stream 100 by the sender 12 and receipt of the content stream by the user electronic device 13 based on the content stream data 132.

The presence of latency in video game content streams may result in there being a significant lag between the user providing an input expecting an action to be performed, and the action actually being performed in the content stream. For video games where actions need to be performed within a given window of time, the presence of latency may result in the user apparently missing the window of time, accord-ing to the modified stream that is provided to the user electronic device 13, even if an input was actually provided within said window of time.

The network condition that is determined is not limited to latency. Other network conditions may also be determined in accordance with the present disclosure. For example, the content stream data 132 may be indicative of the strength of the broadband signal that is used by the user electronic device 13.

In an alternative embodiment, the sender 12 sends out a ping message along with the sending of the content stream

100 to the user electronic device 13. The ping message measures the time it takes for the message to be sent to the user electronic device 13 from the sender 12 and back again. The lower the time, the lower the latency.

Once the device data 130 received from the user elec-tronic device 13 has been processed, the continually gener-ated content stream 100 and/or one or more settings asso-ciated with either the content stream 100 is modified by the sender 12 in response to the device data 130.

FIGS. 5A-5E show alternative methods of modifying the content stream 100 in response to the determination that latency is present at step 430 of method 400.

Figure 5A:
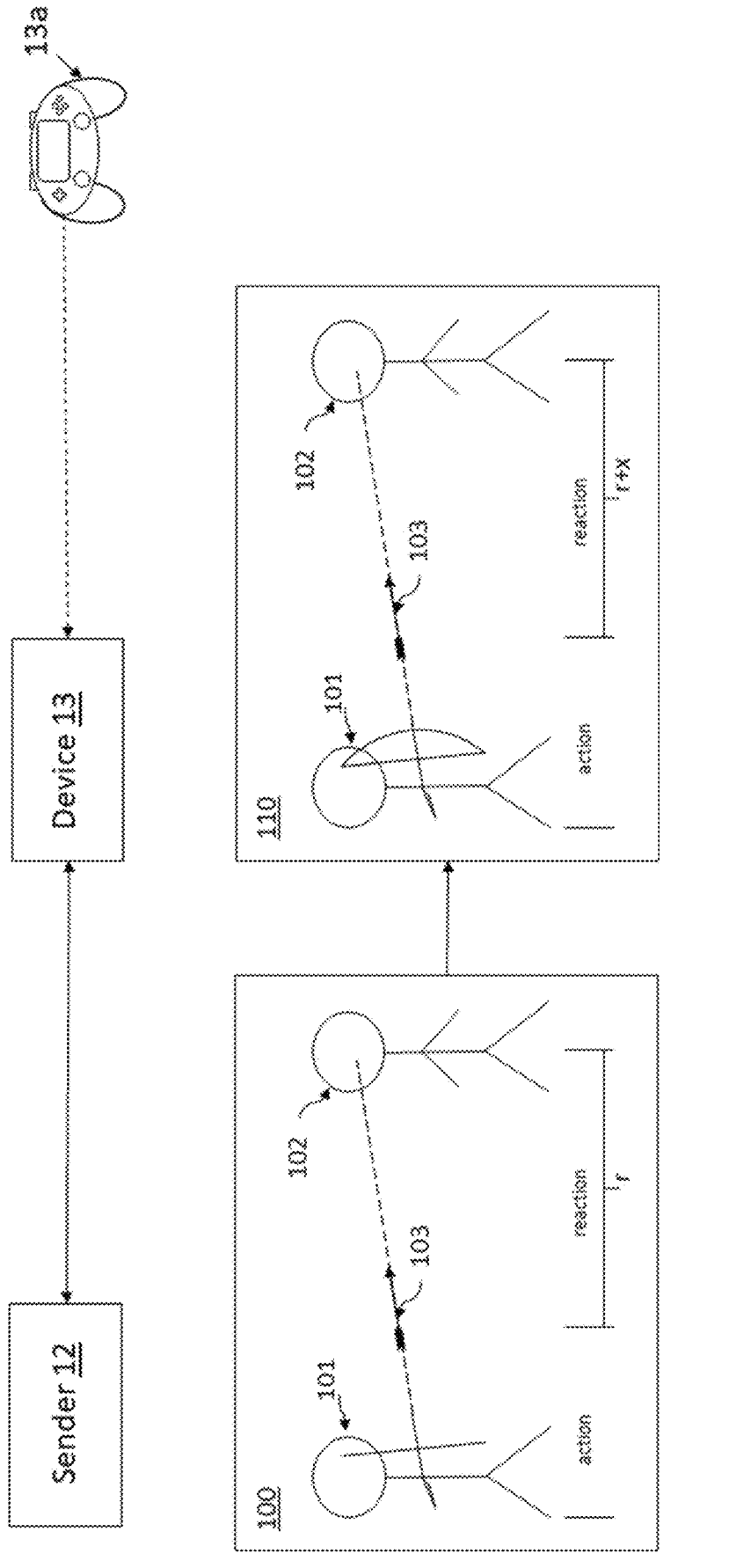
FIGS. 5A-5E illustrate alternative methods of modifying the content stream according to an embodiment of this disclosure.

FIG. 5A shows a method of modifying the content stream 100 by modifying a user input window "r". In this embodi-ment the playable character is the character 102 and the NPC is the character 101. FIG. 5A shows steps 410-430 in which the content stream 100 is continually generated and sent to the user electronic device 13 by the sender 12. FIG. 5A further shows a user input window "r" which represents a time within which user input data 131 is to be provided, via the input device 13*a*, in order for the character 102 to avoid the arrow 103.

In this embodiment, upon determining that latency is present, the sender 12 modifies the content stream 100 by increasing the user input window "r" to a modified user input window "r+x". As such, a modified content stream 110 is generated including the modified user input window "r+x".

In an alternative embodiment, the user input data 131 may be indicative of the user wishing to increase a difficulty level of the video game content stream 100. In this embodiment, the sender 12 modifies the user input window r such that the time within which the user is to provide an input is smaller, thus increasing the difficulty of the video game which now requires a faster reaction time from the user.

Figure 5B:
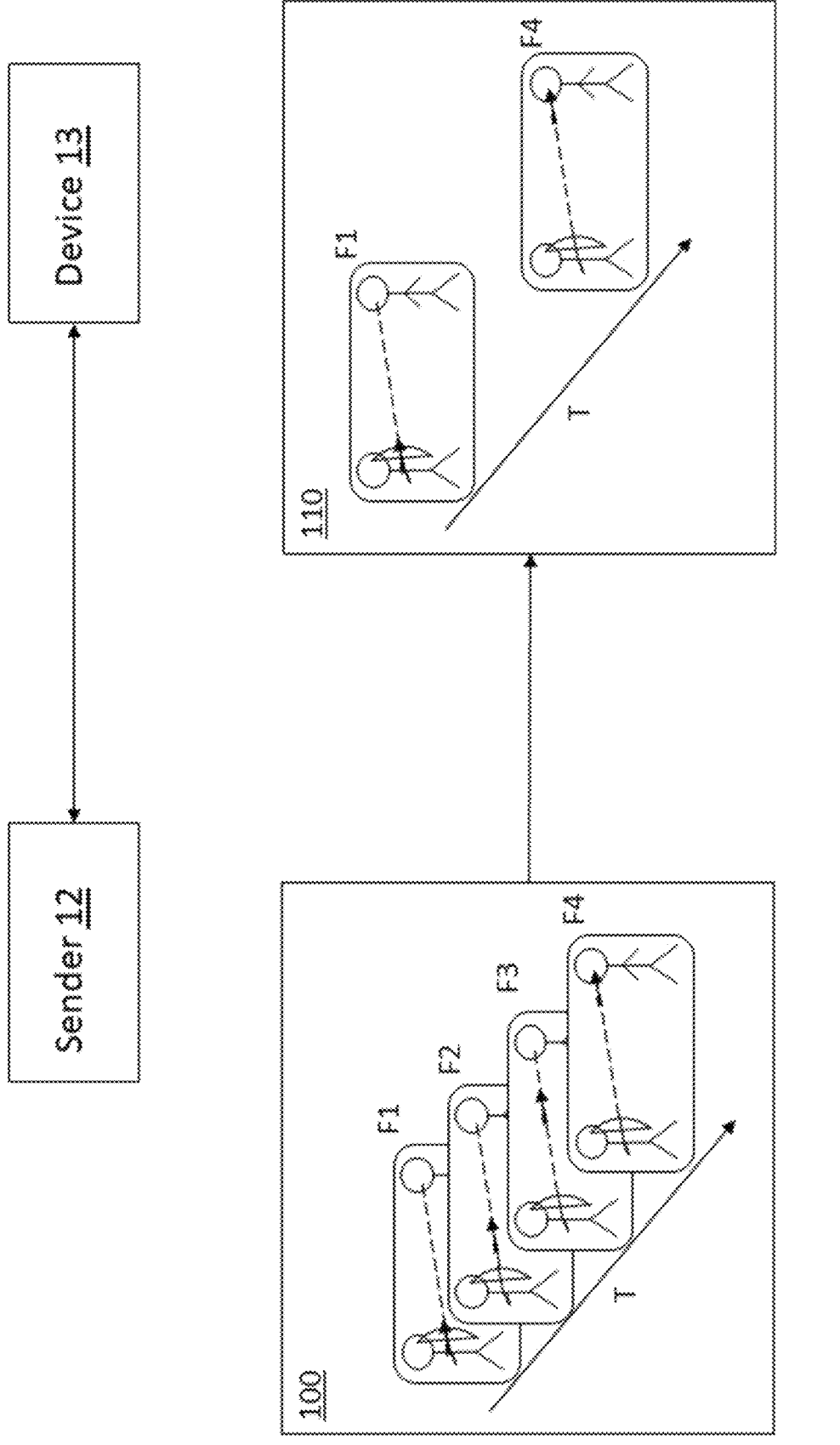

FIG. 5B shows a method of modifying the content stream 100 by adjusting a refresh rate of the content stream. The content stream 100 in FIG. 5B is shown by a plurality of frames F1-F4 within a given time "T" that depict the trajectory of the arrow 103. In this embodiment, the sender 12 provides the content stream 100 at a framerate of 4/T, however any number of frames may be provided based on the content of a video content stream.

Upon determining that latency is present, the sender 12 modifies the content stream 100 by reducing the framerate. As shown in the modified content stream 110, the number of frames F1-F4 have been reduced from 4/T to 2/T. Frames F2 and F3 have therefore been removed to reduce the size of the modified content stream 110. This in turn reduces the amount of time taken (which reduces the latency) for the modified content stream 110 to be sent from the sender 12 to the user electronic device 13 as less data is required to be sent overall.

Figure 5C:
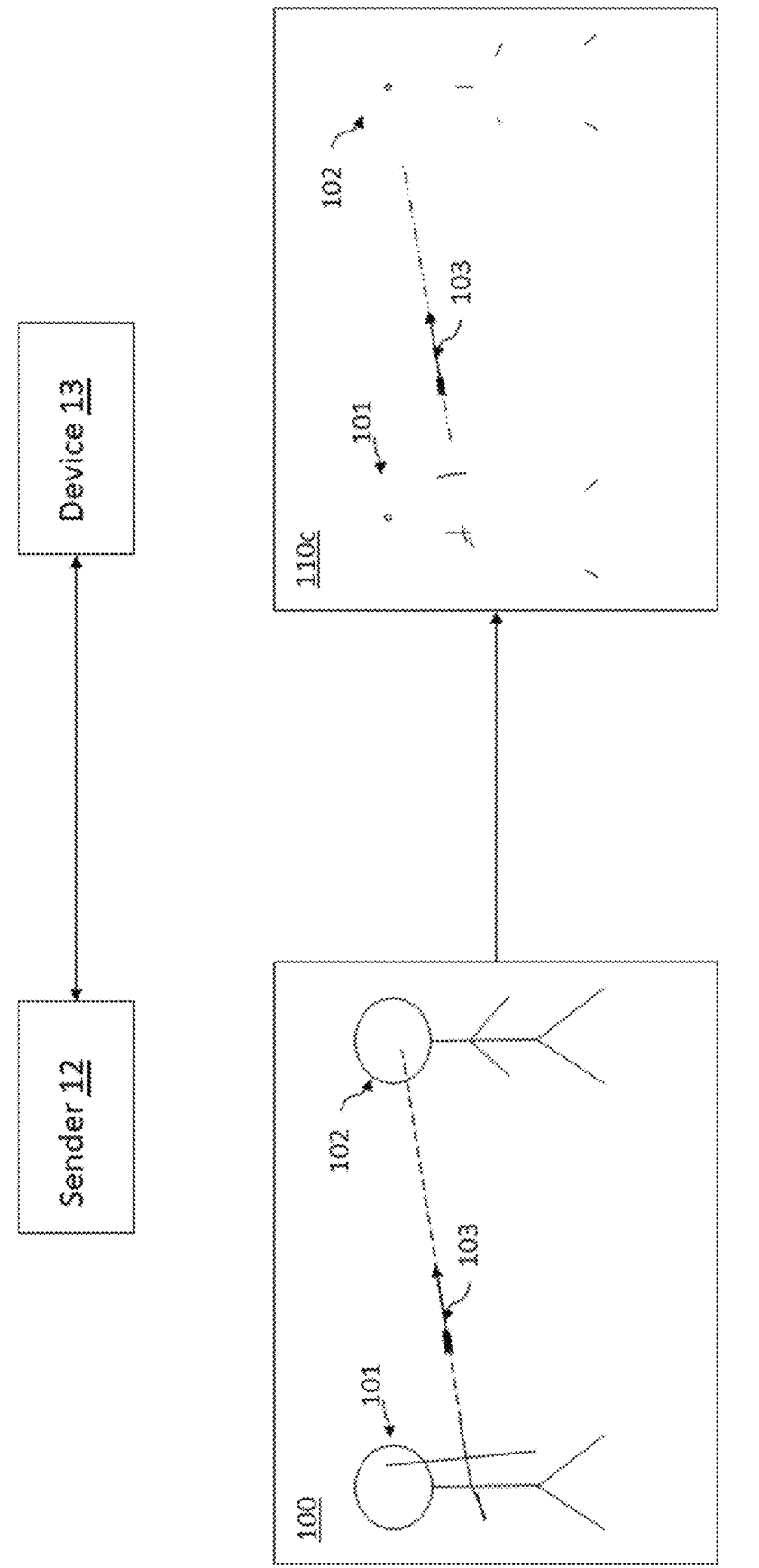

FIG. 5C shows a method of modifying the content stream 100 by adjusting the level of detail (LOD) of elements within the content stream.

In this embodiment, upon determining that latency is present, the sender 12 modifies the content stream 100 by reducing the level of detail of one or more elements within the content stream 100. As shown in the modified content stream 110, the playable character 101 and the NPC 102 have been modified such that they are rendered at a lower LOD compared to the content stream 100. This in turn reduces the amount of time taken (which reduces the latency) for the modified content stream 110 to be sent from the sender 12 to the user electronic device 13 as less data is required to be sent overall.

The sender 12 may determine which of the elements within the content stream 100 should be modified by reducing the LOD. The sender 12 may determine the elements within the content stream 100 which require higher levels of computation compared to the rest of the elements within the content stream 100 to be selected for modification.

In an alternative embodiment, the determination of which elements are to be modified is based on positional data. For example, the sender 12 may determine which embodiments exist beyond a threshold distance from a given point within the 3D scene as defined by the video game content stream 100, and then determine that said elements are to be modified as low LOD elements in the modified content stream 110.

It will be appreciated that a plurality of methods of determining which elements are to be modified as low LOD elements may be utilised by the present disclosure. As such, the present disclosure is not limited to any one such method.

Figure 5D:
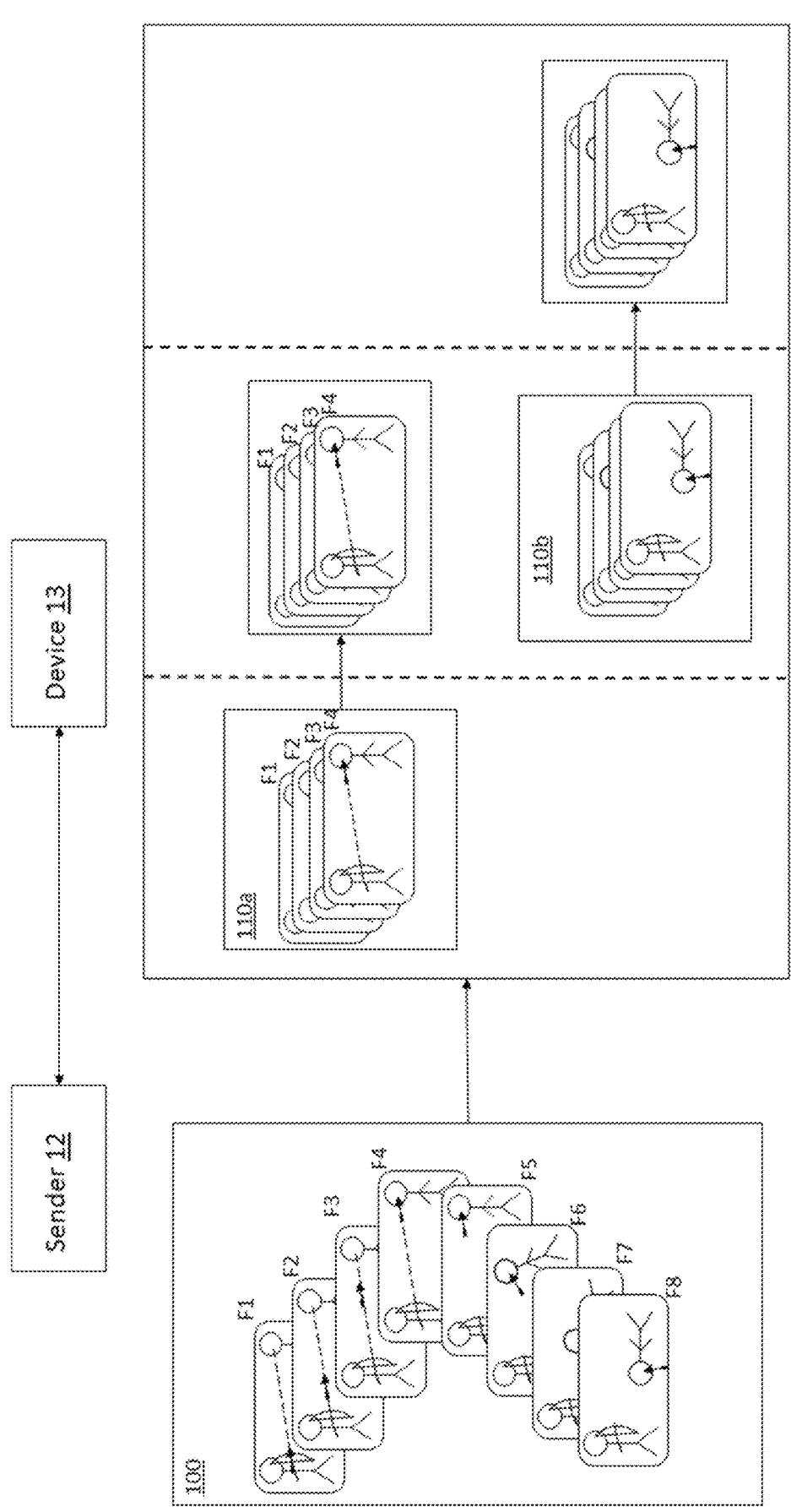

FIG. 5D shows a method of modifying the content stream 100d by portioning the content stream 100d. The content stream 100 in FIG. 5B is shown by a plurality of frames F1-F8 which depict a scene showing the arrow striking the NPC 102 and the NPC 102 subsequently falling to the floor. In this embodiment, the content stream 100 comprises 8 frames, however any number of frames may be provided based on the content of a video content stream.

As mentioned above, the process of the sender 12 generating the content stream 100 and then sending the content stream 100 to the user electronic device 13 is a continuous process. The generated content stream 100 is modified in response to the device data 130.

In this embodiment, upon determining that latency is present, the sender 12 modifies the content stream 100 by dividing the frames F1-F8 of the content stream 100d into two portions, each of which are sent to the user electronic device 13 at different times. As shown in FIG. 5D, a first portion 110a of the modified content stream 110 comprises frames F1-F4 (showing the arrow 103 moving towards and striking the NPC 102), and a second portion 110b comprises frames F5-F8 (showing the NPC 102 falling to the ground after being struck by arrow 103).

In this embodiment, the sender 12 generates the first portion 110a and sends the first portion 110a to the user electronic device 13. Whilst the first portion 110a is being sent to the user electronic device 13, the sender 12 then generates the second portion 110b, which is subsequent sent to the user electronic device 13. This method of generating a second portion of the content stream 100 whilst a first portion (which has already been generated) is being sent to the user electronic device may herein be referred to as "buffering".

In the context of a video game content stream, according to the method of this embodiment, the user of the user electronic device 13 is able to play the first portion of the modified content stream 110 while the second portion is still being generated in preparation to be provided to the user electronic device 13. This in turn reduces the amount of time taken (which reduces the latency) for the modified content stream 110 to be sent from the sender 12 to the user electronic device 13 as smaller portions of the data are sent one by one rather than a large chunk of data all at once.

It will be appreciated that the number of portions that the modified content stream 110 is divided into is not limited to two portions. Any number of portions may be used depending on the type of content stream and the amount of data of the content stream.

Figure 5E:
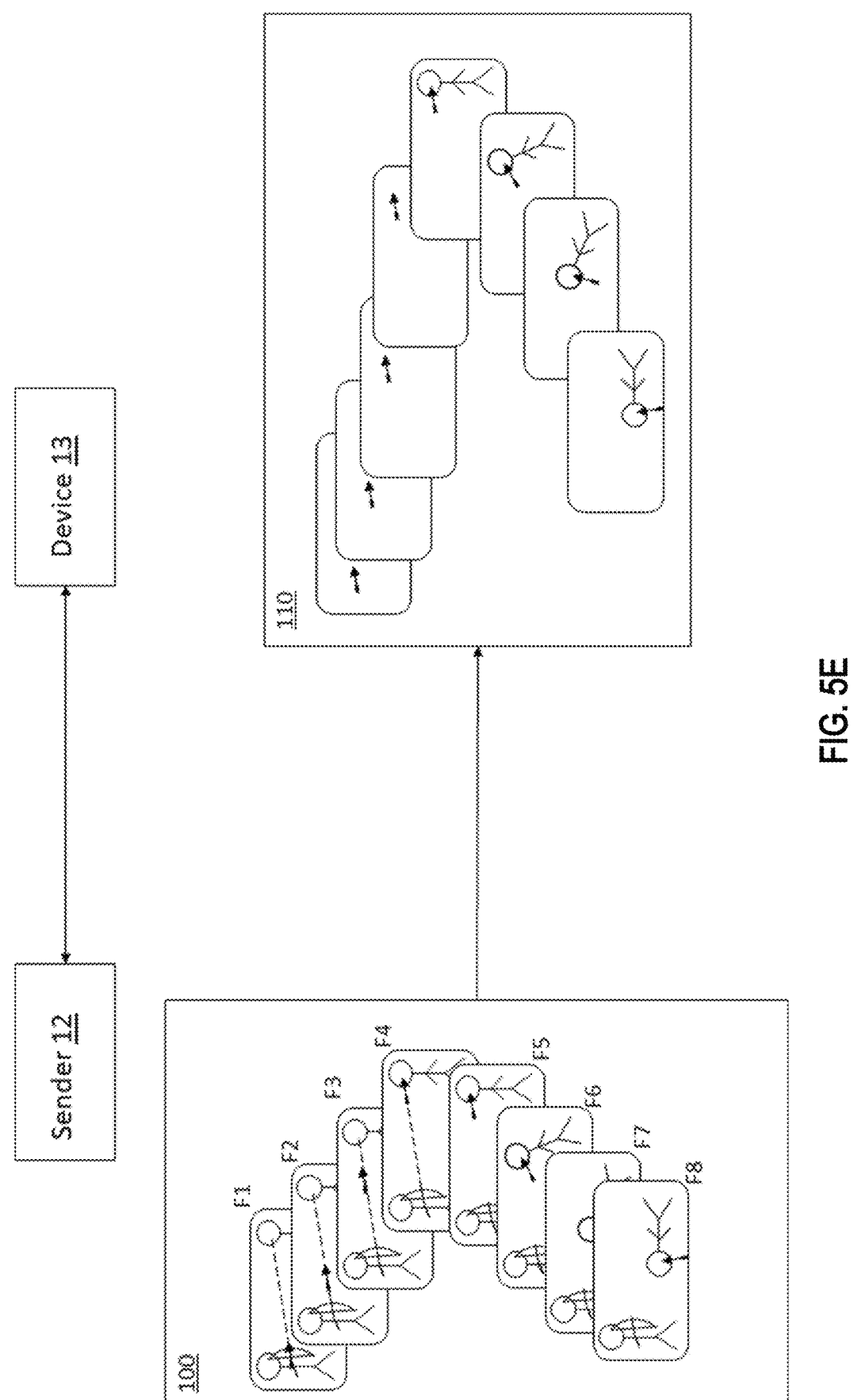

FIG. 5E shows a method of modifying the content stream 100 by portioning the content stream 100d. The content stream 100 in FIG. 5B is shown by a plurality of frames F1-F8 which depict a scene showing the arrow striking the NPC 102 and the NPC 102 subsequently falling to the floor. In this embodiment, the content stream 100 comprises 8 frames, however any number of frames may be provided based on the content of a video content stream.

In this embodiment, upon determining that latency is present, the sender 12 identifies the dynamic and static elements within each frame of the content stream 100 and generates a modified content stream 110 which only update the dynamic elements. As shown in FIG. 5E, in frames F1-F4, only the arrow is determined to be dynamic, and in frames F5-F8, only the NPC 103 with the arrow stuck to it is determined to be dynamic.

By only updating the dynamic elements, the sender 12 is able to reduce the amount of data that is sent to the user electronic device, which in turn reduces the amount of time taken (which reduces the latency) for the modified content stream 110 to be sent from the sender 12 to the user electronic device 13. Since the user electronic device 13 already has the data for the static elements from the content stream 100 that was initially sent, all that needs to be updated are the dynamic elements.

In an embodiment, the methods as described above are performed even when no network conditions are determined in step 430 of method 400.

It will be appreciated that the present disclosure is not limited to just one of the methods as illustrated in FIGS. 5A-E and as described above to account for latency. A combination of the above methods may also be used.

Figure 6:
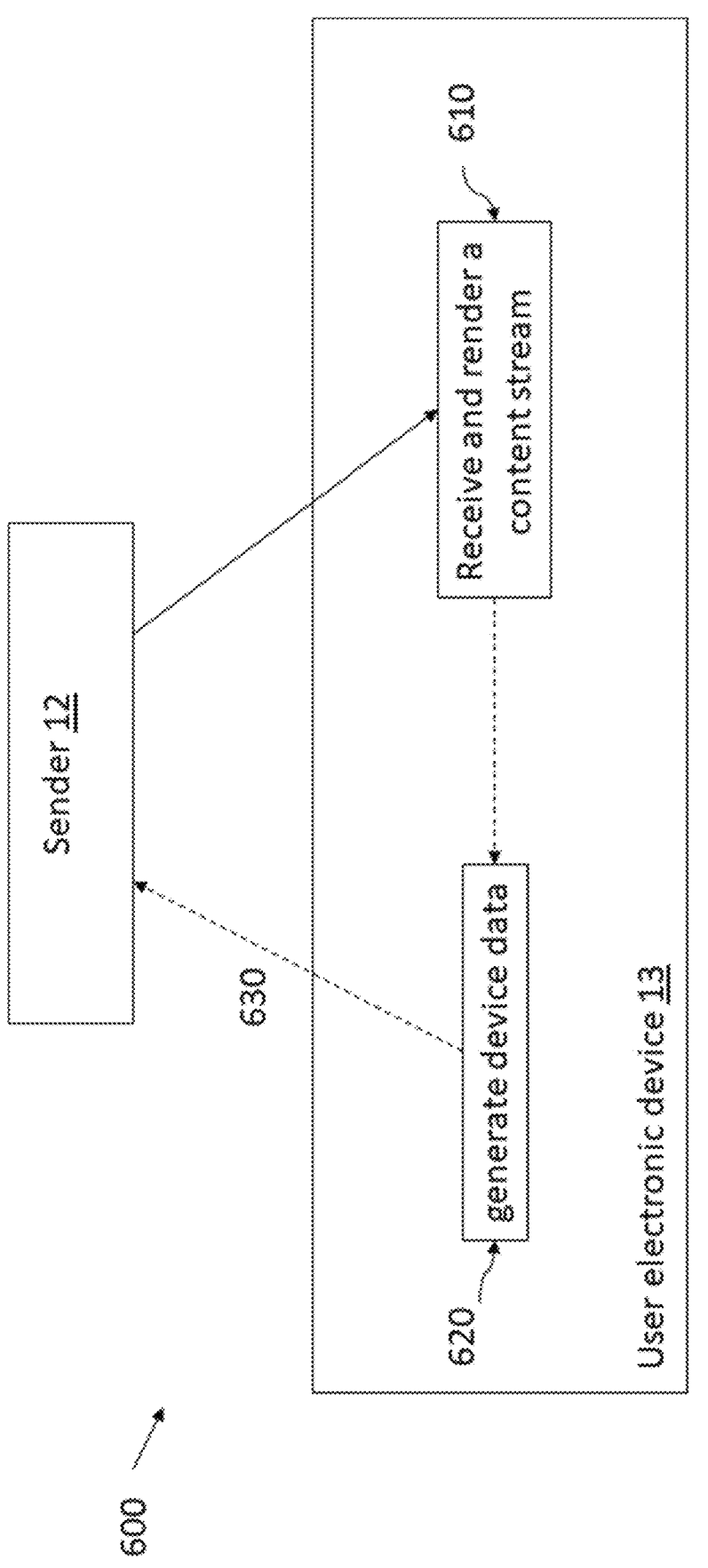
FIG. 6 is a flowchart illustrating a method of rendering a content stream according to an embodiment of this disclosure.

A method 600 of rendering a content stream according to an embodiment of this disclosure is illustrated in the flowchart in FIG. 6. As such, method 600 is from the perspective of the user electronic device 13. For simplicity, the steps of method 600 are described in the context of a video content stream such as the one illustrated in FIG. 3. The present disclosure is however not limited to a video game content stream as the techniques described herein apply equally to other types of content streams.

At step 610, the content stream 100 is received by the user electronic device 13 from the sender 12 and rendered by the user electronic device 13. This step is a constant process where the sender 12 constantly sends the content stream which is rendered at the user electronic device 13. In this embodiment, the user electronic device 13 receives the content stream 100 via any wired or wireless communication channel.

At step 620, the method 600 includes generating device data 130 at the user electronic device 13, and at step 630 the generated device data 130 is sent from the user electronic device 13 to the sender 12. In this embodiment, the device data 130 comprises user input data 131 and content stream data 132. The user input data comprises instructions update a game state of the content stream 100 such that the playable character 101 is to release the arrow 103 towards the NPC 102. The content stream data 132 comprises information regarding the time of receipt of the content stream 100.

As mentioned above, the sender 12 obtains the device data 130 and modifies the content stream 100 in response to the device data 130. The modified content stream 110 is modified according to any of the methods (or a combination thereof) as described above in relation to Figured 5A-E. The modified content stream 110 is then sent from the sender to the user electronic device 13 where it is rendered in accordance with the continuous process of receiving and rendering a content stream at the user electronic device 13.

Figure 7:
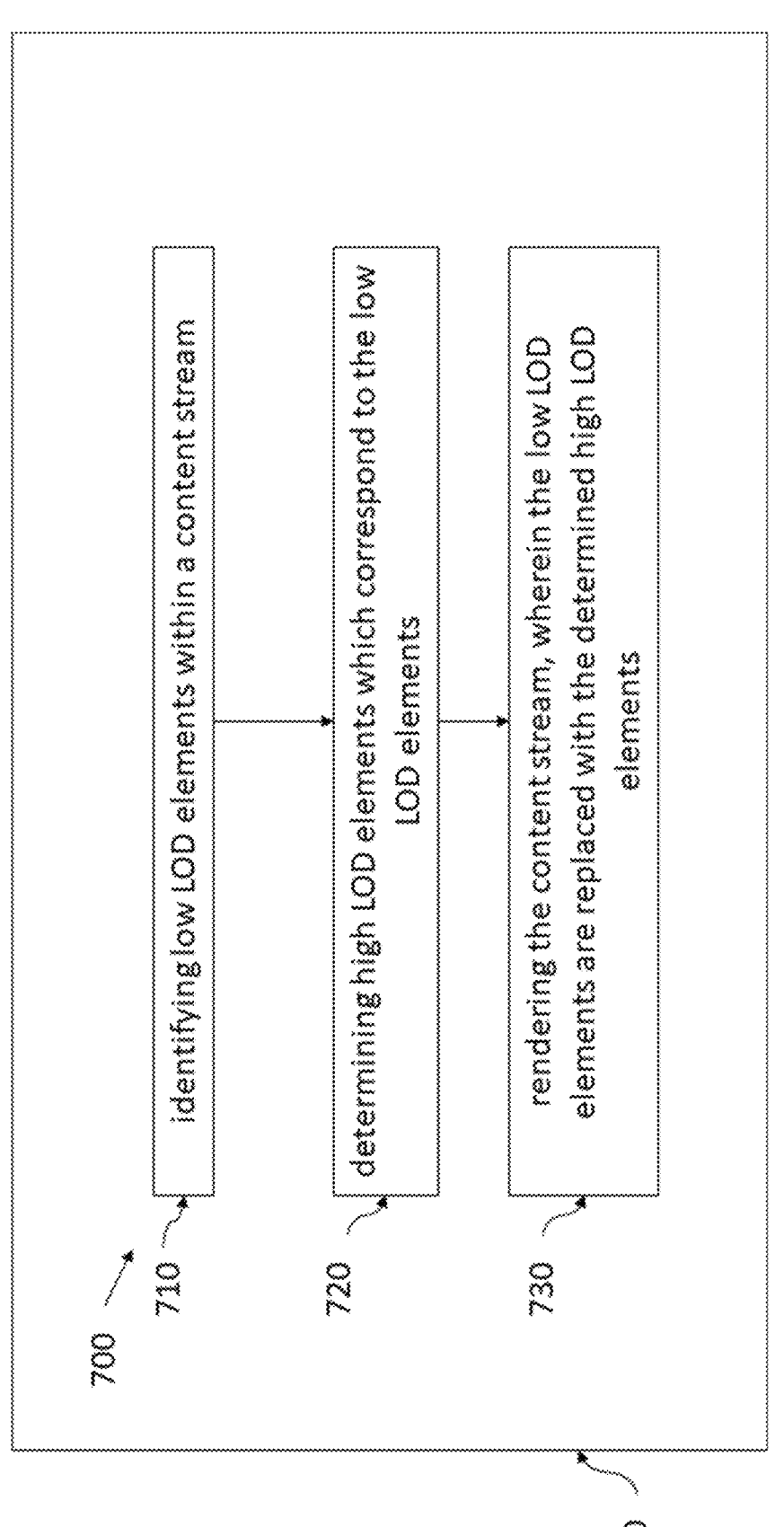
FIG. 7 is a flowchart illustrating a method of rendering a content stream comprising low LOD elements according to an embodiment of this disclosure.
Figure 8:
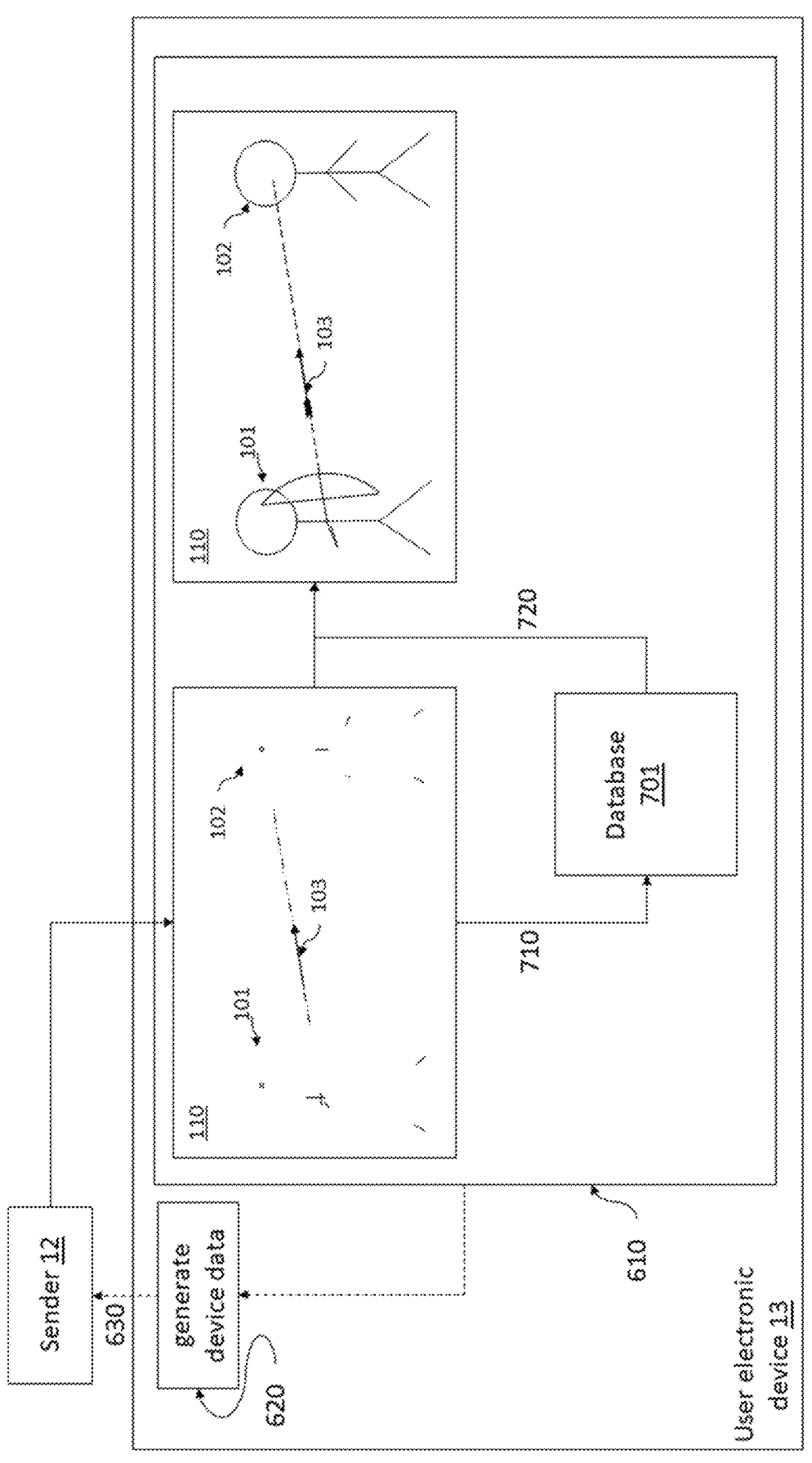
FIG. 8 illustrates a method of rendering the content stream of FIG. 8 according to an embodiment of this disclosure.

FIG. 7 shows a method 700 of rendering a content stream with low LOD elements, and corresponding FIG. 8 illustrates the method 700. As mentioned above, at step 610, the user electronic device receives the modified content stream as part of the continuous process of receiving and rendering a content stream. Method 700 is therefore a particular embodiment where the received content stream comprises low LOD elements.

Method 700 is related to the embodiment of FIG. 5C which describes how the content stream 100 is modified to provide a modified content stream 110 with low LOD elements. The following embodiment is therefore method 800 as applied to the modified content stream of FIG. 5C. As such, further reference is made to FIG. 5C.

At step 710, the method 700 includes identifying low LOD elements within the received content stream, and at step 720, the method 700 includes determining high LOD elements which correspond to the low LOD elements.

The user electronic device 13 identifies the low LOD elements within the received modified content stream 110 and looks to a database 701 to find high LOD elements which correspond to the low LOD elements in the modified content stream.

The user electronic device 13 utilises an artificial neural network (ANN) within the user electronic device 13 to perform the identification of the low LOD elements, and subsequently to look up the high LOD elements within the database 701.

In an alternative embodiment, the user electronic device 13 performs the identification and matching of elements within the database using hardware and/or other means.

At step 730, the method 700 includes rendering the content stream, wherein the low LOD elements are replaced with the determined high LOD elements. Once corresponding high LOD elements are found in the database 710, the user electronic device 13 renders the modified content stream 110 by replacing the low LOD elements with the corresponding high LOD elements to generate the modified content stream 110.

Accordingly, there has been described an method of modifying a content stream provided to a user electronic device, the method comprising receiving device data from the user electronic device, processing the device data to determine whether one or more network conditions have been met, and modifying the content stream and/or one or more settings associated with either the content stream and or a game server. There has also been described a method of rendering a content stream provided by a sender, the method comprising, sending device data, receiving a modified content stream, and rendering the modified content stream.

Although particular embodiments of this disclosure have been described, it will be appreciated that many modifications/additions and/or substitutions may be made within the scope of the claims.

The invention claimed is:

1. A computer-implemented method comprising:
   receiving a particular user input to a user electronic device after a time window for modifying a content stream based on user inputs had ended;
   determining a presence of network latency for the user electronic device when the particular user input was received; and
   in response to determining a presence of network latency for the user electronic device when the particular user input was received, modifying the content stream based on the particular user input that was received after the time window for modifying the content stream based on user inputs had ended.

2. The computer-implemented method of claim 1, wherein modifying the content stream based on the particular user input comprises portioning the content stream into a plurality of frames.

3. The computer-implemented method of claim 2, wherein portioning the content stream into a plurality of frames comprises:
   identifying one or more dynamic elements and one or more static elements within each frame of the plurality of frames; and
   for each frame, updating the one or more dynamic elements.

4. The computer-implemented method of claim 3, wherein for each frame, updating the one or more dynamic elements:
   maintaining the one or more static elements from a previous frame.

5. The computer-implemented method of claim 3, wherein the state of the one or more static or the one or more dynamic elements can switch between the plurality of frames.

6. The computer-implemented method of claim 5, wherein a dynamic element of the one or more dynamic elements in a first frame of the content stream is a static element in a second frame of the content stream.

7. The computer-implemented method of claim 1, comprising:
   modifying the content stream when no network latency was determined.

8. The computer-implemented method of claim 1, wherein modifying the content stream based on the particular user input comprises modifying a user input window r.

9. The computer-implemented method of claim 1, wherein the modifying the content stream based on the particular user input comprises adjusting a refresh rate of the content stream, wherein the refresh rate is indicative of a number of image frames of the content stream that are displayed per second.

10. The computer-implemented method of claim 1, wherein modifying the content stream based on the particular user input comprises replacing one or more elements within the content stream with a lower level of detail (LOD) version of the one or more elements.

11. The computer-implemented method of claim 1, wherein modifying the content stream based on the particular user input comprises:
   portioning the content stream into a first and second portion, and wherein providing the content stream; and
   providing the first portion to the user electronic device whilst the second portion is being buffered.

12. The computer-implemented method of claim 1, wherein modifying the content stream based on the particular user input comprises a combination of: (i) portioning the content stream into a plurality of frames, (ii) modifying a user input window r, (iii) adjusting a refresh rate of the content stream, (iv) replacing one or more elements within the content stream with a lower level of detail (LOD) version of the elements, and (v) portioning the content stream into a first and second portion.

13. A system comprising one or more computers and one or more storage devices storing instructions that are operable, when executed by the one or more computers, to cause the one or more computers to perform operations comprising:

receiving a particular user input to a user electronic device after a time window for modifying a content stream based on user inputs had ended;

determining a presence of network latency for the user electronic device when the particular user input was received; and in response to determining a presence of network latency for the user electronic device when the particular user input was received, modifying the content stream based on the particular user input that was received after the time window for modifying the content stream based on user inputs had ended.

14. The system of claim 13, wherein modifying the content stream based on the particular user input comprises portioning the content stream into a plurality of frames.

15. The system of claim 14, wherein portioning the content stream into a plurality of frames comprises:

identifying one or more dynamic elements and one or more static elements within each frame of the plurality of frames; and for each frame, updating the one or more dynamic elements.

16. The system of claim 15, wherein for each frame, updating the one or more dynamic elements:

maintaining the one or more static elements from a previous frame.

17. One or more non-transitory computer readable storage media storing instructions that when executed by one or more computers cause the one or more computers to perform operations comprising:

receiving a particular user input to a user electronic device after a time window for modifying a content stream based on user inputs had ended;

determining a presence of network latency for the user electronic device when the particular user input was received; and in response to determining the presence of network latency for the user electronic device when the particular user input was received, modifying the content stream based on the particular user input that was received after the time window for modifying the content stream based on user inputs had ended.

18. The one or more non transitory computer readable storage media of claim 17, wherein modifying the content stream based on the particular user input comprises portioning the content stream into a plurality of frames.

19. The one or more non transitory computer readable storage media of claim 18, wherein portioning the content stream into a plurality of frames comprises:

identifying one or more dynamic elements and one or more static elements within each frame of the plurality of frames; and for each frame, updating the one or more dynamic elements.

20. The one or more non transitory computer readable storage media of claim 19, wherein for each frame, updating the one or more dynamic elements:

maintaining the one or more static elements from a previous frame.

* * * * *